United States Patent Office 2,703,152
Patented Mar. 1, 1955

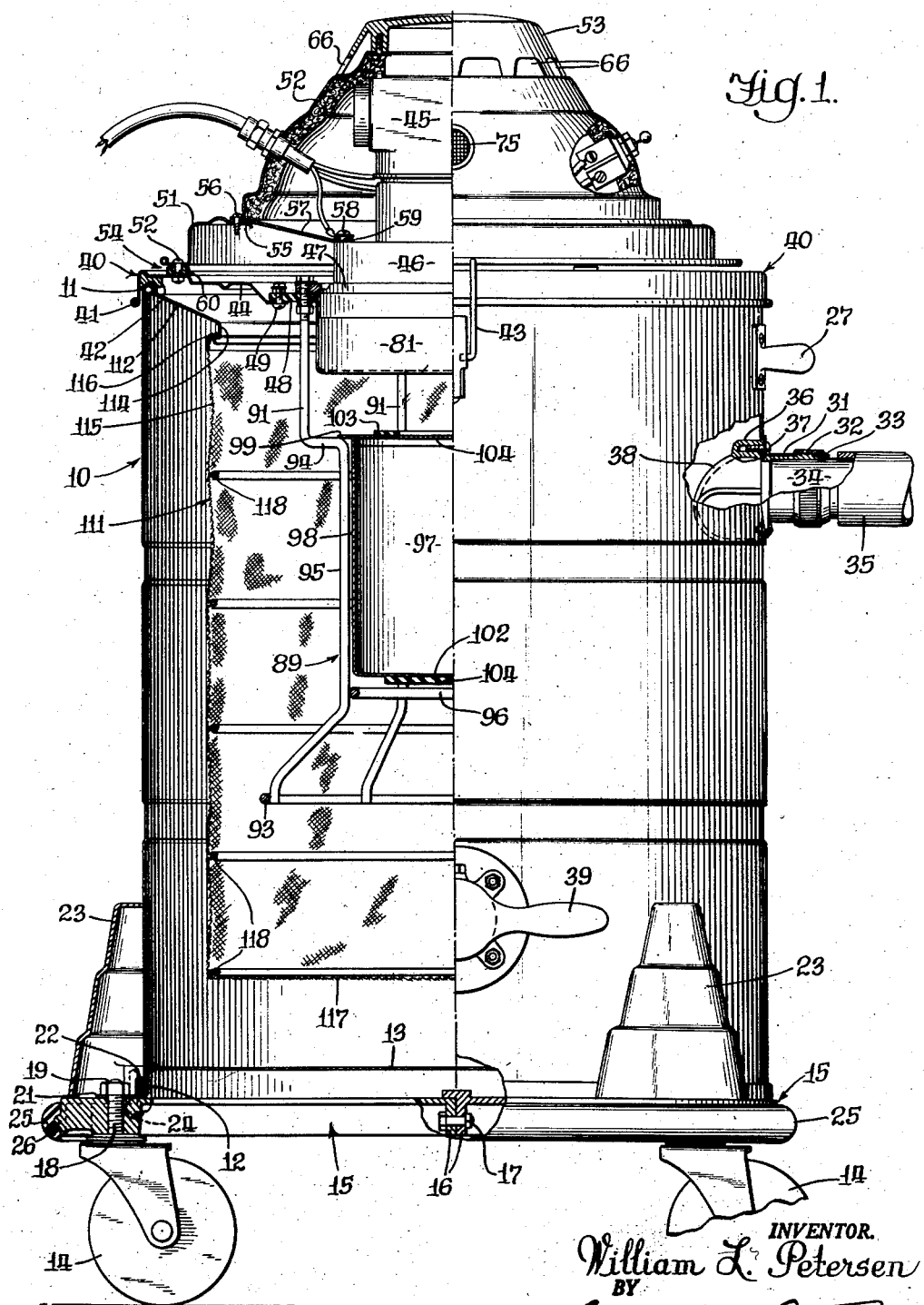

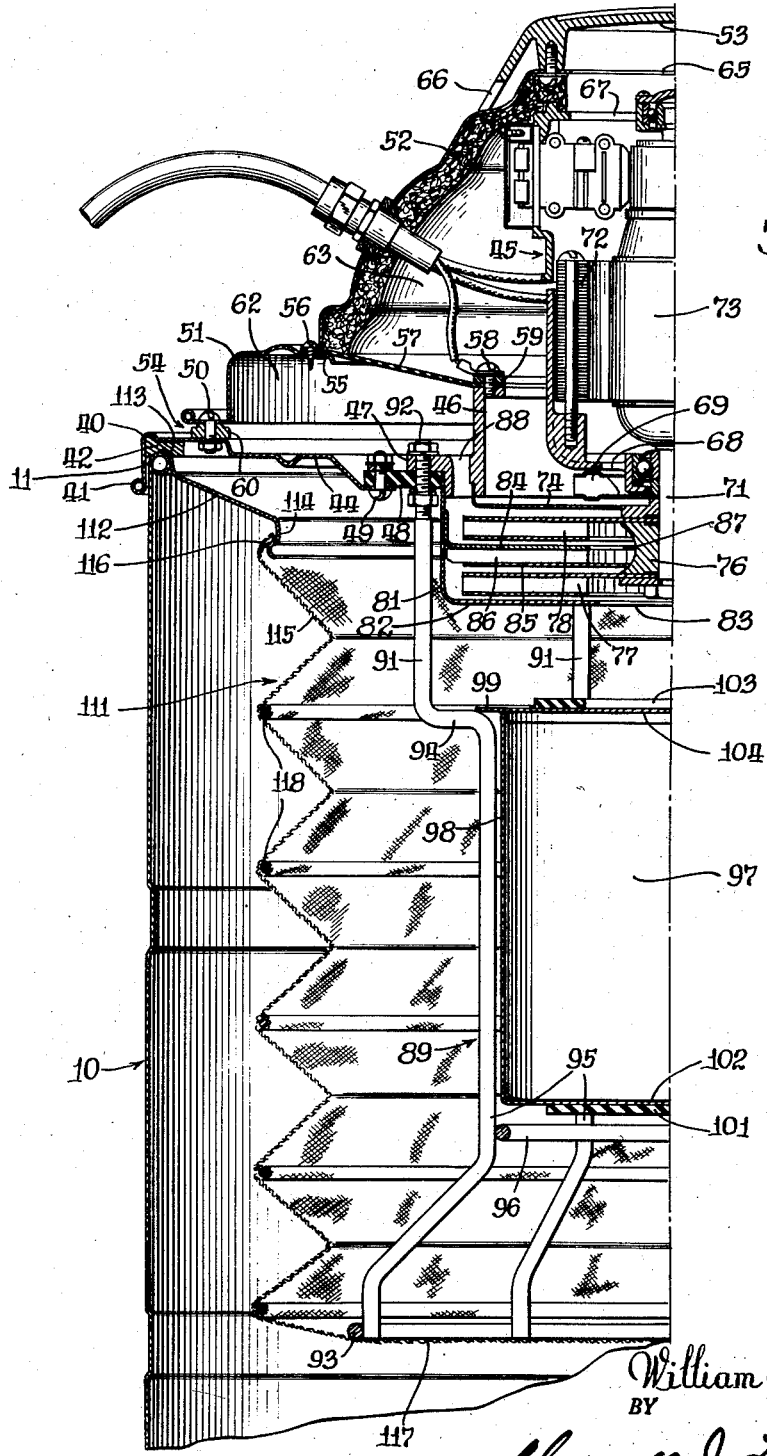

2,703,152

SUCTION CLEANER

William L. Petersen, Muskegon, Mich., assignor to Clarke Sanding Machine Company, Muskegon, Mich., a corporation of Michigan Application March 25, 1952, Serial No. 278,356

3 Claims. (Cl. 183—37)

This invention relates to suction cleaning equipment, and has specific reference to a suction cleaner of unique construction whereby it is ideally suited for use in picking up water, foam and suds incident to floor scrubbing or rug cleaning operations, as well as for use in conventional dry vacuum cleaning.

It is a primary object of the invention to provide a single suction cleaning device which, by a simple conversion, may be adapted to either wet or dry use. A closely related object is the provision of a suction cleaning device wherein the operating parts of the cleaner are of such construction and so related to each other as to afford an unusually free flow of air through the device in either wet or dry operation, so that the full suction capabilities of the motor and suction fan can be utilized without substantial losses, and the unit will thus be capable of unusually efficient and dependable operation under all conditions of use.

A still further object is the provision of a machine as indicated above wherein the essential operating parts of the mechanism for wet and dry cleaning are nested within each other in a manner not heretofore contemplated, but which results in a marked improvement in efficiency of function, and at the same time permits quick, easy and convenient conversion of the machine from wet to dry operation and vice versa.

More specifically, it is an object of the invention to provide a cleaner wherein the parts essential to the water pickup operation are so designed as to accomplish their purpose in a more satisfactory and dependable manner than heretofore accomplished, yet are so related to other instrumentalities used in dry vacuum cleaning that they accomplish their intended purpose without causing interference with the efficiency of the machine during the machine's operation in dry vacuuming. Another related object is the provision of a machine wherein the air filter used in dry operation may be quickly, easily and conveniently lifted from the tank of the machine to permit the dirt to be removed. A still further related object is the provision of a machine which may be suited to wet or dry operation merely by removing the filter or replacing it.

Another important object of the invention is the provision of a vacuum cleaner adapted for either wet or dry use, yet wherein dry air passing through the cleaner is caused to pass through a filter having a comparatively great surface area so that the highest degree of filtering efficiency can be attained without unduly reducing the effective suction at the intake of the machine.

A still further object of the invention is the provision of a dry air filter of unique construction and design, so arranged that it is self-activated in accordance with variations of pressure occurring within the machine, so that the normal variations of air pressure and flow caused by use of the machine maintain the filter in a state of continual agitation, which is effective to shake dust and dirt from the filtering surfaces into the bottom of the filter container and maintain the filtering surfaces in comparatively clean, fresh and effective condition at all times.

A still further object is to provide a machine having the functional characteristics indicated above, yet so designed as to be comparatively inexpensive to manufacture and quiet in operation, and so arranged that the machine exhaust is dissipated into the surrounding air without perceptible sound and without creating objectionable turbulence or direct air blasts around the machine.

The foregoing objects are accomplished in the present invention by a machine which may include a more or less conventional cylindrical tank or container provided with a removable top cover upon which a suction fan and driving motor are carried. The arrangement is quite unique, however, in that the housing of the suction fan extends directly into the container of the machine in concentric relationship therewith and is arranged to be directly engaged by a large flat sealing plate or valve, carried by an extremely large shutoff float, positioned at the center of the tank and within the filter bag itself. The filter bag is also of unique construction so that it is self-cleaning, being continually agitated and in constant motion. This is automatically accomplished by the continuous variations of air pressure which result as a consequence of normal vacuum cleaning operations.

By the above arrangement it has been found entirely practicable to provide a single machine suited for both wet and dry cleaning, since the design and construction of the parts are such that the float and shutoff mechanism essential to the water pickup does not in any way interfere with the normal operation of the machine as a dry type vacuum cleaner. Similarly, the design of the machine is such that the fabric filter utilized in dry operation can be quickly and conveniently removed to convert the machine to condition for water pickup.

A preferred form of the invention is illustrated in the drawings of this specification, wherein:

Figure 1 is a side elevational view of a preferred form of the machine with the left half of the view shown in section to illustrate its internal construction; and Figure 2 is a fragmental sectional view similar to Figure 1, showing the self-cleaning filter bag in a changed position to illustrate its mode of operation.

In the machine illustrated, the working parts of the mechanism are mounted upon and within an upright tank or container 10 which is preferably of sheet metal construction and, as shown, is in the form of a cylinder disposed on a vertical axis. Conveniently, the upper edge of the tank may terminate in a rolled or beaded rim 11, and the lower edge may be rolled into an interlocking seam 12 whereby the vertical walls of the tank are joined with a horizontal sheet metal tank bottom 13. In the commercial embodiment of the invention it has been found desirable to mount the machine on a relatively heavy and rigid undercarriage having a plurality of casters 14, and to this end there have been provided four identical supporting brackets 15 which are provided with flanges 16 bolted to each other by machine screws 17 so that the four brackets form the undercarriage or supporting frame for the tank 10. The casters 14 may then be mounted directly onto the individual brackets 15 by passing their screw threaded shanks 18 through apertures provided therefor, and securing them by nuts 19. The nuts 19 also hold the tank 10 on the undercarriage. To accomplish this, sheet metal clips 21 are secured on the shanks 18 by the nuts 19, and these clips are provided with flanges 22 which partially surround and engage the beaded edge 12 of the lower rim of the tank. Thus the tank may rest directly on the upper surfaces of the four brackets 15, and be firmly secured thereto without the need of any drilling, welding, cutting or other machine operations. It should also be noted that the sheet metal of the tank itself need not have any fastening holes nor other special structures, and that the metal of which it is formed can be painted, plated, galvanized, or otherwise finished over the entire surface, inside and out.

As shown, the undercarriage brackets 15 of the machine are each provided with an ornamental hollow cap 23 to cover the fastening clips 21 and nuts 19. These caps or covers are secured to the brackets 15 by screws 24 extending upwardly therethrough. The undercarriage of the machine is completed by a marginal rubber bumper 25 which is preferably formed as an endless member having a groove on the underside thereof, so that it may be stretched around the assembled brackets 15, and will be held in engagement thereon by projections 26 formed on the brackets. Thus the bumper 25 provides a marginal cushion around the bottom of the tank and the outer edge of the undercarriage. The machine is also preferably provided with one or more handles 27 to facilitate moving the machine about the floor or emptying the tank.

The tank 10 includes an inlet fitting 31 with a threaded coupling nut 32 and locking ring 33 by which the machine may be coupled to the tubular fitting 34 of a suction hose 35. It is contemplated that the machine may be used with any desired type of vacuum cleaning or water pickup tool attached to the remote end of this hose. The inlet fitting 31 is secured to the vertical wall of the tank 10 in the upper portion thereof, and, as shown, is provided with an inside member 36 into which a plurality of fastening screws 37 are threaded. The inside member includes a deflector 38 arranged to deflect the flow of incoming air or water in a downward and generally circumferential direction on the inner surface of the tank.

A drain valve 39 is also provided. This valve is preferably located at or near the bottom of the tank to facilitate emptying the liquid therefrom.

The operating mechanism of the machine is mounted on the tank cover 40. The cover 40 is preferably provided with an edge flange 41 surrounding the top rim 11 of the tank 10, and the cover is sealed thereon by a gasket 42. One or more quick acting trunk latches 43 are mounted on the side walls of the tank to hold the cover firmly in position. The cover 40 has a top surface 44 with a large aperture at its center, and the motor 45 and its fan housing are mounted within this aperture. As shown, the motor 45 and the fan housing have a common supporting frame 46 provided with an outstanding flange 47 bolted to a heavy rubber mounting ring 48. The rubber ring 48 is in turn secured to the inner edge of the top portion 44 of the machine cover by a plurality of mounting screws 49. The frame 46 is of generally cylindrical form, surrounding the lower end of the motor 45 and secured thereto or integral therewith.

The motor is surrounded by a housing comprising a ring member 51, a shell 52 and a cap 53. The ring 51 is secured to cover top portion 44 of the cover 40 by a plurality of machine screws 50, each of which is provided with a rubber spacer 60 to permit unrestricted air flow in the annular space 54 between the cover and the ring. The ring 51 also serves as a mounting for the shell 52, which is secured to the inwardly extending flange 55 of the ring 51 by any convenient means, as by the screws 56 illustrated. A flexible rubber sheet 57 has its outer marginal edge secured between the flange 55 and the lower flange of the motor shell 52. This rubber sheet extends inwardly to the upper rim of the frame 46, where it is secured by screws 58 and a clamping ring 59. Thus, the rubber sheet 57 functions as a gasket and sound deadening member between the ring 51 and the shell 52, and also serves as a partition between an exhaust air compartment 62 and a compartment 63 surrounding the motor.

The upper end of the shell 52 has an air inlet aperture 65 covered by the cap 53, and the cap is notched at 66 to provide inlets through which air may be drawn from the atmosphere and down through the top of the shell to the open end frame 67 of the motor. The lower end of the motor frame is open at 68 and a cooling fan 69 is mounted on the armature shaft 71. Thus, air for cooling the motor is drawn directly from the atmosphere into the motor housing and passes downward between field laminations 72 and the armature 73, after which it is discharged through the central apertures 68 and cooling fan 69.

The lower end of the frame 46 is closed by the flat plate 74, so that the air discharged from the motor cooling fan 69 passes upwardly through the frame 46 to the compartment 63, and thence through screened apertures 75 to the atmosphere. A layer of fiber glass 80 on the inside of the shell 52 serves to deaden motor and suction noises.

The motor shaft 71 also carries a hub 76 on which rotary fan blade assemblies 77 and 78 of the main suction fan are mounted. These blades are surrounded by an exterior fan housing 81 having a lower bottom plate 82 in which an air inlet aperture 83 is provided. The housing 81 also includes an intermediate wall or partition positioned between the rotors 77 and 78 and having an upper plate 84 and lower plate 85, with radial fins 86 between the plates.

From the foregoing it will be seen that the rotors 77 and 78 comprise a two stage suction fan. The fan serves to exhaust air from the interior of the tank 10 by drawing it in through the aperture 83, from which it passes outwardly in a radial direction through the rotor 77. The air is then caused to flow inwardly between the upper and lower walls 84 and 85 of the partition, and to pass through the aperture 87 to center of the rotor 78.

The air leaving the second stage rotor 78 flows through the passages 88 to the compartment 62. It is then discharged from the machine through the thin, narrow, annular discharge passage 54, provided between the top 44 of the cover and the lower edge of the ring member 51.

The flange 47 of the frame 46 on which the motor 45 is mounted also serves as the mounting for a central cage structure generally designated as 89. The cage consists of a plurality of individual wires or rods 91 each having their upper ends bolted to the flange 47 by threaded nuts 92. The lower extremities of each of the rods 91 are joined by a circular ring or rim 93, and the individual rods 91 may be offset inwardly at 94 to provide a plurality of parallel vertical slide portions 95 joined at their lower ends by a ring 96.

This cage accomplishes a two-fold purpose. First, it comprises a slide mounting and guide for the float of a shutoff valve mechanism. It also functions as a limiting frame to control the action of a self-cleaning filter bag as described hereinafter.

The float controlled shutoff valve employs a relatively large, centrally disposed float 97, preferably in the form of a hollow canister having vertical side walls 98 in sliding engagement with the vertical portions 95 of the cage 89, and an outwardly extending flange 99 at the top of the canister arranged to engage and rest on the offset portions 94 of the rods, so that the downward motion of the float is limited. Thus the float will normally be held in spaced relationship below the fan housing 81 as illustrated in Figure 1. The canister is closed at the top by a large, flat closure plate 104 and, as shown, is also closed at the bottom by the plate 102 to which a circular rubber sheet 101 is attached.

A rubber ring or sealing gasket 103 is secured to the top closure plate 104 and cemented thereto, so that when the float is lifted by rising water within the tank, the gasket 103 will come into flat surface engagement with the lower plate 82 of the fan housing 81, and the closure plate 104 will close the air inlet to the fan.

The self-cleaning filter bag, generally designated as 111, is provided with a narrow ring-like mounting member 112 having a thin, curved flange or edge portion 113 so designed as to fit snugly between the upper beaded rim 11 of the tank and the gasket 42 thereon, so that the ring 112 may be secured in position merely by placing it on the rim of the tank and buckling the top member 40 in place. The mounting member 112 includes a lower annular flange 114 having a groove in which the uppermost fabric 115 of the filter bag 111 is secured, as by a tie wire 116. The lower end of the filter bag 111 is closed by a fabric bottom portion 117, and the walls of the bag are provided with a plurality of annular wire rings 118 secured to the fabric of the bag at intervals spaced apart from each other. Thus the rings 118 are entirely supported by the fabric of the bag, and act as weights to insure proper opening of the bag under all circumstances. At the same time, these rings limit the movement of the fabric and prevent any substantial collapse of the bag in response to external air pressure imposed thereon, so that the full surface of the entire fabric of the bag will be available for effective filtering under all conditions, as will appear from the following description.

In the operation of the machine in conventional dry vacuum cleaning, the suction hose leading to the cleaning tool is attached to the inlet or suction fitting 31 on the side of the tank 10. Thus when the motor 45 is energized, the fan within the housing 81 will exhaust air from the inside of the tank, and air flowing inwardly through the suction hose 35 will bring about the suction required for the vacuum cleaning operation.

The air entering the tank 10 will pass inwardly through the fabric of the filter bag 111, which is effective to remove any dust, dirt or foreign particles carried by the air stream. The filtered air will then pass upwardly and be drawn radially inwardly into the annular gap between the top closure plate 99 of the shutoff float 97 and the bottom face plate 82 of the fan housing 81, so that air will enter the inlet aperture 83 of the fan housing from all sides thereof and will thus reach the center of the first stage centrifugal fan rotor 77. As hereinbefore mentioned, the air discharge from this rotor will flow radially inwardly between the partition plates 84 and 85 to the aperture 87 leading to the second stage rotor 78, and will then be forced radially outwardly and will flow upwardly through ports 88 in the motor casting into the annular exhaust air chamber 62 between the top plate 44 of the cover and the rubber diaphragm 57. From this chamber the air will be dislodged radially in all directions through the narrow annular air discharge opening 54 between the lower rim of the ring 51 and the top 53 of the cover, so that a large quantity of air may be discharged silently and without setting up direct air blasts or turbulence in the atmosphere surrounding the machine. This is of considerable advantage in several respects, since the absence of direct air blasts about the machine not only reduces noise and overcomes the annoyances caused by direct air blasts, but also largely eliminates the tendency of prior machines to blow loose dust into the air.

It is also to be noted that the apparatus of the present invention does not depend upon the air used for suction purposes to cool the motor. Motor cooling air is drawn inwardly through the notches 66 in the top cap 53, and is thence drawn downwardly through the openings 65 and 67, and through the motor 45 and ports 68 by the motor cooling fan 69. The air discharged from the motor cooling fan flows into the compartment 63 between the motor housing and the shell 52, and is discharged through the screened vents 75 (Figure 1).

When the machine is operated as a dry vacuum cleaner, the shutoff valve 97 and closure plate 99 therefor do not function, but it is to be noted that they are nested in a position within the filter bag 111 where they afford no interference with the normal flow of dry air and are entirely clear of and spaced from the filtering surfaces.

The filter assembly of the machine is a feature of novelty and of considerable importance by itself as well as in the overall combination. One of the most important features of the filter is the design and arrangement of the filter bag, together with its mounting and the means employed to permit continual agitation of the filtering surfaces, yet hold them in sufficiently extended position so that the entire surface of the filter fabric may be effectively used. This is accomplished in the present invention by the use of the cylindrical fabric filter bag 111 having wire rings 118 secured to the bag at intervals therealong, with the entire bag mounted and freely suspended from the upper end, but provided with the internal cage 89 to limit the vertical movement of the bag in response to variations of air pressure within the device.

In the normal operation of any vacuum cleaner, the operator moves the suction nozzle back and forth over the surface being cleaned, and in so doing passes the suction inlet of the nozzle over surface irregularities such that the inward flow of air at the nozzle is greatly restricted at certain moments of the operation, and is almost entirely free at other moments. This continued opening and closing of the air inlet to the nozzle results in a highly variable flow of air into the tank of the machine, and as a consequence, imposes a continually changing pressure upon the fabric of the filter bag. When the flow of air into the machine is substantially unrestricted, the pressure on the filter bag increases and causes the bag to collapse in a somewhat accordion-like manner until its bottom 117 engages the lower ring 93 of the cage 89, which holds the bag in the partially extended position of Figure 2. When the pressure is reduced due to partial or complete blocking of the air inlet, the bag tends to return to fully extended position by its own weight, assisted by the weight of the wire rings incorporated into its walls.

Thus in normal operations the pressure variations resulting from moving the suction nozzle of the vacuum cleaner over the surface being cleaned will bring about constant motion of the filtering surfaces as the bag tends to expand or contract. This constant motion is of advantage in keeping the filtering surfaces of the bag free from any accumulation of dust or dirt, since the agitation of the filter fabric loosens any foreign matter thereon and allows the dirt to fall into the bottom of the tank where it accumulates until the tank is emptied.

It is to be noted, however, that the presence of the internal cage 89 within the filter limits the collapsing movement thereof sufficiently so that the entire filter surface is effective at all times, and so that the movement of the side walls is limited to what may be termed an accordion action, so that the bag is not permitted to completely collapse nor to come into sufficiently substantial surface contact with other parts as to impair the efficiency of filtering.

The machine may be converted for use as a water pickup merely by removing the cover, lifting the filter assembly therefrom and replacing the cover. The incoming air stream will now normally contain quantities of suds, foam and water which will accumulate in the bottom of the tank 10 until drained therefrom through the drain valve 39 provided for the purpose. In the event, however, that the level of liquid or foam within the container approaches the level of the air intake to the suction fan, the shutoff float 97 will be buoyed upwardly sufficiently to be affected by the suction of the fan, with the result that the float will be snapped sharply upwardly, bringing the closure plate 99 and its gasket 103 into flat, firm engagement with the bottom 82 of the fan housing and effectively closing the air inlet 88 thereto.

The specific form of float and shutoff mechanism used in the present device has considerable advantage over forms utilized heretofore, in that it accomplishes far more dependable operation than other known shutoff devices, yet does so by the use of a comparatively simplified structure. It appears that one of the important practical features of the present structure arises from the complete absence of any pipes, ducts, tubes or similar structures in the air passages, and it is believed that the elimination of such parts permits a considerably greater degree of efficiency and a consequent increase in suction over other machines, and that the elimination of such tubes and pipes brings about a further advantage in providing more dependable and trouble-free operation, particularly as to the float and shutoff operation. With the present arrangement the float may be about one-third of the entire diameter of the machine container (or even larger if desired) and may be about one-third or more of the height thereof, without imposing any limitations on the functioning of the machine, and it has been found that a float of such large dimensions is more stable and dependable in operation than any devices heretofore employed in the art, and that it is less subject to sticking, jamming or to influences by unexpected splashes, surges or eddying movements of the water and foam within the tank.

It has also been found that the central disposition of the float on the axis of the fan and on the central axis of the container gives it additional stability of operation and avoids false responses as a result of splashing, turbulence or surging of the water within the container. It is also believed that the relatively large annular air inlet between the top of the float closure plate and the fan housing permits the largest possible air inflow without substantial resistance to air movement, and thus accomplishes a further increase in efficiency.

From the foregoing it is believed apparent that the present invention provides means whereby a single vacuum cleaning unit may be quickly and easily adapted for either wet or dry operation and provides a unique physical arrangement and relationship between the parts whereby they are compactly nested within each other and yet whereby the shutoff valve and its float may be housed within the machine in such a manner as to permit unrestricted proper operation of the self-cleaning agitated type filter therein. In short, the invention provides for elimination of many unnecessary pipes, ports and similar structures, and accomplishes a simplification of mechanical structure together with an increased dependability and versatility of operation.

Having thus described my invention, what I claim as new and desire to protect by United States Letters Patent is:

1. A suction cleaner comprising, in combination, a vertically disposed cylindrical container with a suction inlet thereto; a removable cover on said container with a motor mounted on the cover and centrally disposed with respect thereto; a suction fan having a housing on the underside of the cover and a large centrally disposed air inlet in said housing: a large vertically shiftable closure plate for said air inlet, and a shutoff float comprising a cylindrical container carrying said closure plate and centrally disposed within the first-mentioned cylindrical container below the aforementioned suction fan housing, whereby liquid in the first-mentioned container may lift said closure plate to engage and close the air intake to said fan housing; a central float cage supported wholly by the cover of the machine and concentric therewith, said cage structure including slide portions surrounding the shutoff float for guiding said float and closure plate into operative engagement with the surface of the aforementioned fan housing; a removable self-activating filter assembly entirely surrounding said cage and float and comprising a marginal mounting member having a flange at its outer edge supported on the upper edge of the first-mentioned cylindrical container and secured thereon by said cover, with a tubular fabric filter bag secured to and supported on an inner flange of said mounting member and extending downwardly in generally parallel relationship to the side walls of the first-mentioned cylindrical container and spaced therefrom to a point adjacent the bottom of said container, said filter bag having a plurality of separate, independent, relatively shiftable circular rings secured thereto and supported thereby, said rings being spaced apart from each other at intervals along the fabric of said filter bag whereby they maintain the filter bag circumferentially distended and radially spaced from the float cage but permit limited vertical movement in response to variations in the atmospheric pressure exerted on said bag, together with means for limiting the vertical movement of said filter comprising a lower rim on the float cage spaced from the fully extended position on said filter bag.

2. A suction cleaner comprising, in combination, a vertically disposed cylindrical container with a suction inlet thereto; a removable cover on said container with a motor mounted on the cover and centrally disposed with respect thereto; a suction fan having a housing on the underside of the cover and a large centrally disposed air inlet in said housing; a large vertically shiftable closure plate for said air inlet, and a shutoff float comprising a cylindrical container carrying said closure plate and centrally disposed within the first-mentioned cylindrical container below the aforementioned suction fan housing, whereby liquid in the first-mentioned container may lift said closure plate to engage and close the air intake to said fan housing; a central float cage supported wholly by the cover of the machine and concentric therewith, said cage structure including slide portions surrounding the shutoff float for guiding said float and closure plate into operative engagement with the surface of the aforementioned fan housing; a removable self-activating filter assembly entirely surrounding said cage and float and a mounting member supported on the upper edge of the first-mentioned cylindrical container and secured thereon by said cover, with a tubular filter bag secured to and supported on said mounting member and extending downwardly in generally parallel relationship to the side walls of the first-mentioned cylindrical container and spaced therefrom to a point adjacent the bottom of said container, said filter bag having means to permit limited vertical movement in response to variations in the atmospheric pressure exerted on said bag, together with means on said cage for limiting the vertical movement of said filter.

3. A suction cleaner comprising, in combination, a vertically disposed cylindrical container with a suction inlet thereto; a removable cover on said container with a motor and suction fan mounted on the cover; and a removable self-activating filter assembly comprising a marginal mounting member having a flange at its outer edge supported on the upper edge of the cylindrical container and secured thereon by said cover, with a tubular fabric filter bag secured to and supported on an inner flange of said mounting member and extending downwardly in generally parallel relationship to the side walls of the cylindrical container and spaced therefrom to a point adjacent the bottom of said container, said filter bag having a plurality of separate, independent, relatively shiftable circular rings secured thereto and supported thereby, said rings being spaced apart from each other at intervals along the fabric of said filter bag whereby they maintain the filter bag circumferentially distended but permit limited vertical movement in response to variations in the atmospheric pressure exerted on the fabric of said bag, together with means for limiting the vertical movement of said filter comprising an internal cage shorter than the filter bag and supported on the cover within the upper end of the filter assembly and extending downwardly therein to a point adjacent to but spaced from the fully extended position of said filter bag.

References Cited in the file of this patent

UNITED STATES PATENTS

| | | |
|---|---|---|
| 1,127,242 | Hay | Feb. 2, 1915 |
| 1,176,721 | Zimmer | Mar. 21, 1916 |
| 2,076,304 | Strindberg | Apr. 6, 1937 |
| 2,443,162 | Hallock | June 8, 1948 |
| 2,528,375 | Lilly | Oct. 31, 1950 |
| 2,608,268 | Gerber | Aug. 26, 1952 |
| 2,643,732 | Keen | June 30, 1953 |